United States Patent
Wahlen

(10) Patent No.: US 8,712,931 B1
(45) Date of Patent: Apr. 29, 2014

(54) ADAPTIVE INPUT INTERFACE

(75) Inventor: Christopher J. Wahlen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 178 days.

(21) Appl. No.: 13/172,656

(22) Filed: Jun. 29, 2011

(51) Int. Cl.
*G06F 15/18* (2006.01)

(52) U.S. Cl.
USPC .......................................................... 706/12

(58) Field of Classification Search
USPC .......................................................... 706/52
See application file for complete search history.

(56) References Cited

U.S. PATENT DOCUMENTS

| | | | |
|---|---|---|---|
| 6,694,301 B1 * | 2/2004 | Heckerman et al. | 706/45 |
| 7,296,019 B1 * | 11/2007 | Chandrasekar et al. | 1/1 |
| 7,593,927 B2 * | 9/2009 | MacLennan et al. | 1/1 |
| 7,788,227 B1 * | 8/2010 | Nettleton et al. | 707/640 |
| 7,813,774 B2 * | 10/2010 | Perez-Noguera | 455/575.1 |
| 7,822,699 B2 * | 10/2010 | Katariya et al. | 706/45 |
| 8,024,112 B2 * | 9/2011 | Krumm et al. | 701/423 |
| 8,032,375 B2 * | 10/2011 | Chickering et al. | 704/255 |
| 8,265,778 B2 * | 9/2012 | Taylor et al. | 700/43 |
| 2002/0194229 A1 * | 12/2002 | Decime et al. | 707/533 |
| 2003/0154282 A1 * | 8/2003 | Horvitz | 709/226 |
| 2005/0091012 A1 * | 4/2005 | Przytula et al. | 703/2 |
| 2005/0289463 A1 * | 12/2005 | Wu et al. | 715/533 |
| 2006/0106743 A1 * | 5/2006 | Horvitz | 706/21 |
| 2006/0218088 A1 * | 9/2006 | Flora et al. | 705/39 |
| 2007/0016625 A1 * | 1/2007 | Berstis | 707/200 |
| 2007/0088686 A1 * | 4/2007 | Hurst-Hiller et al. | 707/4 |
| 2007/0124263 A1 * | 5/2007 | Katariya et al. | 706/14 |
| 2007/0219974 A1 * | 9/2007 | Chickering et al. | 707/4 |
| 2007/0239637 A1 * | 10/2007 | Paek et al. | 706/20 |
| 2008/0042978 A1 * | 2/2008 | Perez-Noguera | 345/168 |
| 2008/0055269 A1 * | 3/2008 | Lemay et al. | 345/173 |
| 2009/0048020 A1 * | 2/2009 | Gruen et al. | 463/37 |
| 2009/0098547 A1 * | 4/2009 | Ghosh | 435/6 |
| 2009/0132636 A1 * | 5/2009 | Natanzon et al. | 709/201 |
| 2009/0174667 A1 * | 7/2009 | Kocienda et al. | 345/169 |
| 2009/0281972 A1 * | 11/2009 | Shahani et al. | 706/14 |
| 2010/0070908 A1 * | 3/2010 | Mori et al. | 715/773 |
| 2010/0125570 A1 * | 5/2010 | Chapelle et al. | 707/722 |
| 2010/0159883 A1 * | 6/2010 | Pascal et al. | 455/412.1 |
| 2010/0179930 A1 * | 7/2010 | Teller et al. | 706/12 |
| 2010/0286979 A1 * | 11/2010 | Zangvil et al. | 704/9 |
| 2012/0166373 A1 * | 6/2012 | Sweeney et al. | 706/14 |

FOREIGN PATENT DOCUMENTS

WO   WO 2009016631 A2 *   2/2009   .............. G06F 17/27

* cited by examiner

*Primary Examiner* — Kakali Chaki
*Assistant Examiner* — Fuming Wu
(74) *Attorney, Agent, or Firm* — Novak Druce Connolly Bove + Quigg LLP

(57) ABSTRACT

User input on a computing device can be intelligently predicted using one or more learning algorithms. When user text input is received, an input repository comprising a plurality of text items is accessed. The plurality of text items includes a plurality of user-specific text items, which are classified according to a probabilistic model. One or more input predictions are inferred by applying the probabilistic model to the user text input. A suggested text input is presented using an output element of the computing device. The suggested text input is based on the user text input and one or more text items from the input repository. Additional input is received which overrides the suggested text. Any text associated with the user override is then classified within the probabilistic model, thereby updating the input repository based on the user override.

25 Claims, 11 Drawing Sheets

ADAPTIVE INPUT INTERFACE

BACKGROUND

People are increasingly utilizing portable computing devices that have a wide variety of capabilities. In many cases, these devices can communicate over various wireless channels, and include a wide variety of input mechanisms. Unfortunately, many portable computing and electronic devices include very small-scale keyboards on which it can be difficult for users to type with speed and accuracy. To help users overcome the difficulty of using such keyboards, some devices include software to analyze user input as the user types and predict the user's intended final input. Some devices simply replace the user's input with the predicted input. Other devices may present a selection of suggestions as the user types and allow the user to decide whether to accept one of the suggestions. However, such software may result in user frustration if the software does not learn from historical user input and improve the predictions and/or suggestions.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments provide for intelligent prediction of user input on a computing device. In at least some embodiments, an input repository including a plurality of text items is accessed when user text input is received. The plurality of text items can include a plurality of user-specific text items, which are classified according to at least one probabilistic model. One or more input predictions can be inferred by applying the probabilistic model to the user text input. At least one suggested text input can be presented using an output element of the computing device. The suggested text input can be based on the user text input and, for example, one or more text items from the input repository. Additional input may be received which overrides the suggested text. Any text associated with a user override then can be classified within the probabilistic model, thereby updating the input repository based on the user override.

Various other applications, processes and uses are presented below with respect to the various embodiments.

Figure 1:
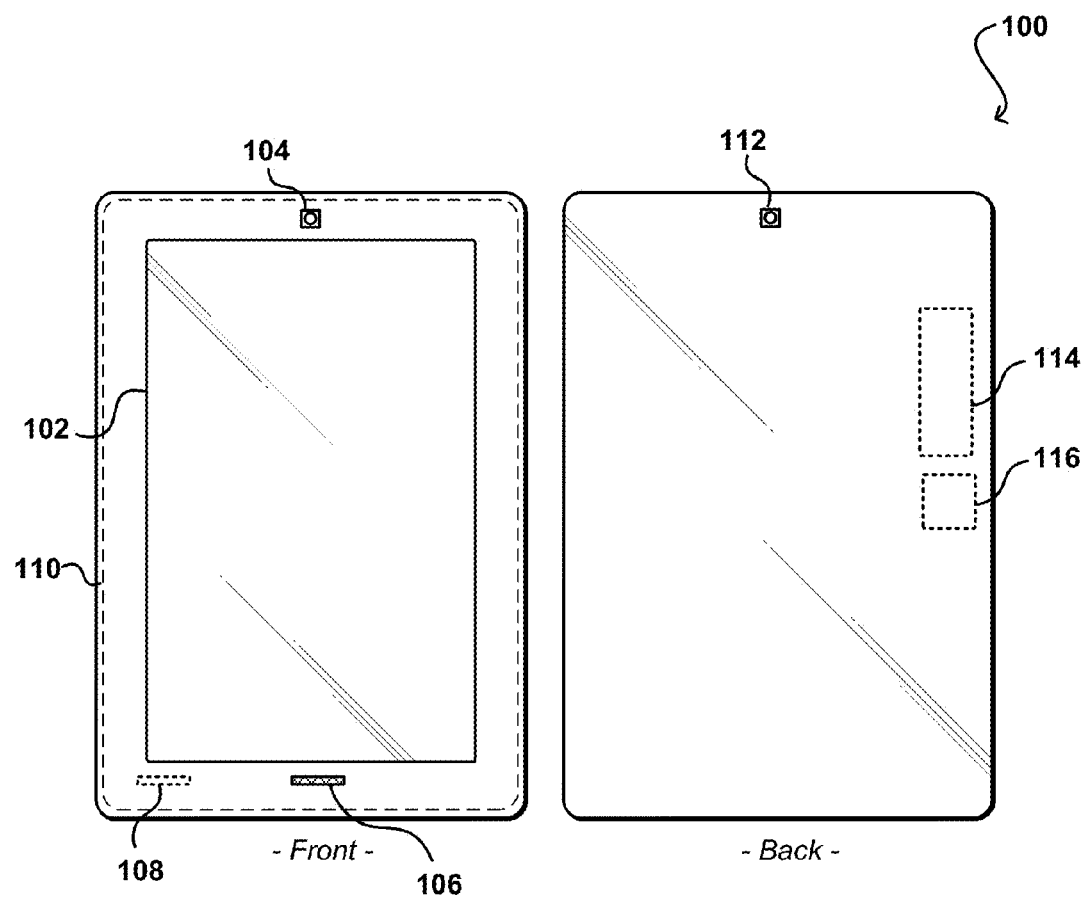
FIG. 1 illustrates front and back views of an example computing device that can be used in accordance with various embodiments.

FIG. 1 illustrates front and back views of an example computing device 100 that can be used in accordance with various embodiments. Although one type of computing device (e.g., a smart phone, an electronic book reader, or tablet computer) is shown, it should be understood that various other types of electronic device that are capable of determining, processing, and providing input can be used in accordance with various embodiments discussed herein. The devices can include, for example, desktop computers, laptop computers, personal data assistants, cellular phones, video gaming consoles or controllers, and portable media players, among others.

In this example, the computing device 100 has a display screen 102 (e.g., a liquid crystal display (LCD) element) operable to display image content to one or more users or viewers of the device. In at least some embodiments, the display screen provides for touch or swipe-based input using, for example, a physical or virtual keyboard based on capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 110 on other areas of the device as well, such as on the sides or back of the device. While in at least some embodiments a user can provide input by touching or squeezing such a material, in other embodiments the material can be used to detect motion of the device through movement of a patterned surface with respect to the material. Various other inputs can be provided as well as should be apparent in light of the teachings and suggestions contained herein.

The example computing device 100 can include one or more image capture elements for purposes such as conventional image and/or video capture. As discussed elsewhere herein, the image capture elements can also be used for purposes such as to determine motion and receive gesture input. While the computing device in this example includes one image capture element 104 on the "front" of the device and one image capture element 112 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology. The computing device can also include at least one microphone 106 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 100 in this example also includes at least one motion- or position-determining element 108 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 114, such as may include at least one wired or wireless component operable to communicate with one or more electronic devices. The device also includes a power system 116, such as may include a battery operable to be recharged through conventional plug-in approaches, or through other approaches such as capacitive charging through proximity with a power mat or other such device. Various other elements and/or combinations are possible as well within the scope of various embodiments.

Figure 2:
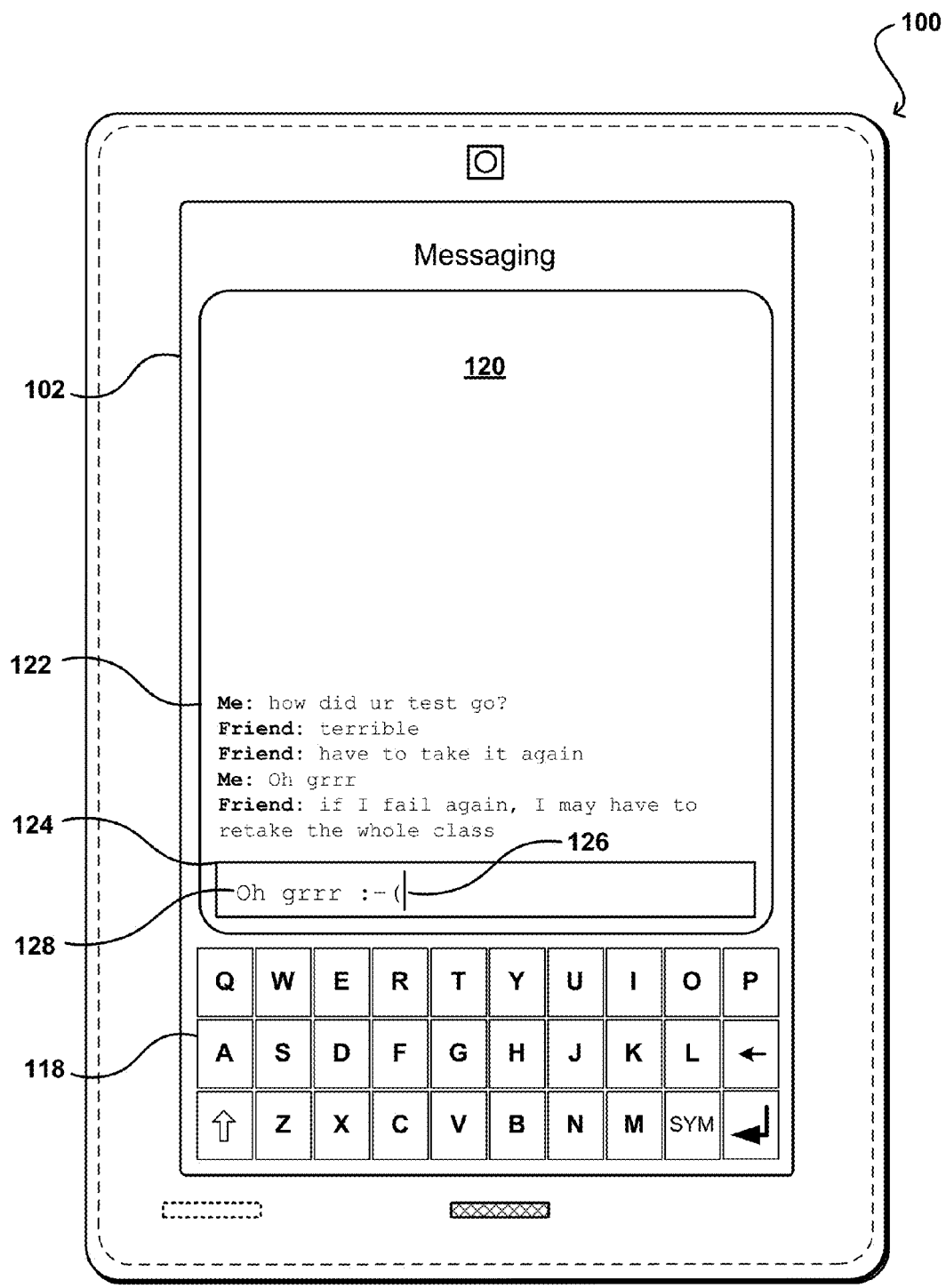
FIG. 2 illustrates an example screen shot of a device presenting a virtual keyboard and utilizing an example text messaging software application that can be used in accordance with various embodiments.

FIG. 2 illustrates a front view of an example computing device 100 that can be used in accordance with various embodiments. It should be understood that reference numbers for similar elements may be carried over between figures for purposes of simplicity of explanation, but that such use should not be interpreted as limiting the scope of the various embodiments. The device 100 includes an example "virtual" keyboard 118 that is displayed on display screen 102, which is able to sense user input entered on keyboard 118 by any conventional key selection technique, including at least touching, tapping, swiping across, or otherwise selecting keys on keyboard 118. Other computing devices may include, or be connected to, a physical keyboard instead of displaying a virtual keyboard. Various other keyboard formats, entry characters, sensing technologies, key selection techniques, and other keyboard-related aspects are possible as well within the scope of various embodiments. Other computing devices may include software to accept user input in the form of voice commands in lieu of or in addition to accepting user input via a keyboard.

Figure 3:
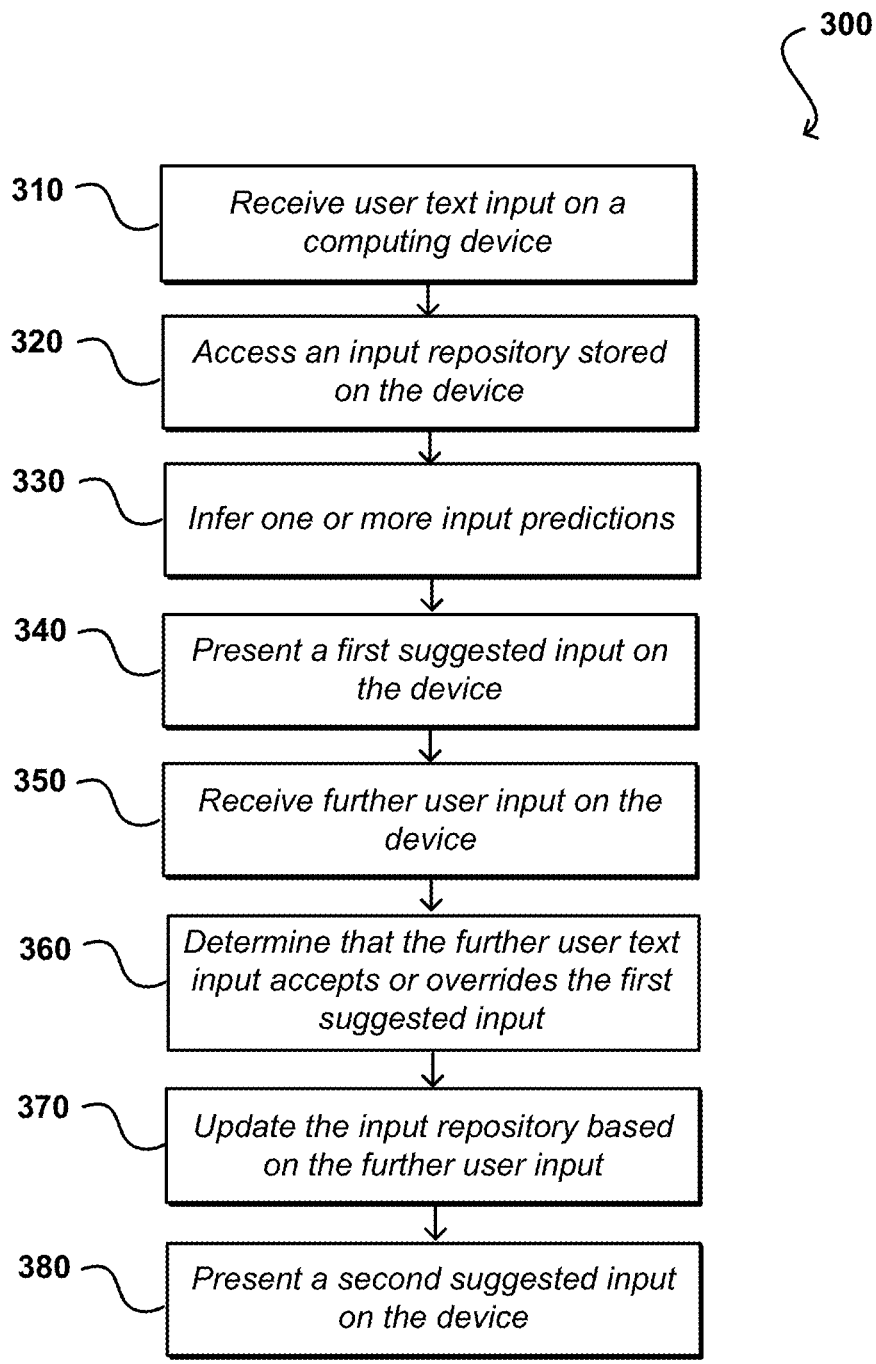
FIG. 3 illustrates an example process that can be executed using a computing device in accordance with various embodiments.

The device 100 includes, and is executing, an example text messaging software application that presents a messaging window 120 on display screen 102. Messaging window 120 includes a scrolling display area 122 where text messages are displayed and a text entry area 124, including a cursor 126 that follows the user's typed input 128 ("Oh grrr :-("). Although the keyboard depicts standard English characters, some embodiments may include a keyboard capable of generating user input in different languages, including various alphanumeric characters, etc. Any software application that accepts user input that can be expressed in characters via computing device 100 is well within the scope of various embodiments FIG. 3 illustrates an example process 300 capable of being executed using a computing device in accordance with various embodiments. In some embodiments, all text entry on the computing device is handled by an operating system (OS)-level application programming interface (API). The API analyzes the user's input on the fly, predicts the user's intended final input, and, upon entry of a terminating character (e.g., space, period, comma, or parenthesis), replaces the user's typed characters with the predicted input. In some embodiments, such functionality may be provided by an individual application. In some embodiments, such functionality may be provided by an add-on or plug-in that serves multiple applications.

In step 310 of FIG. 3, a computing device detects that user text input has been received. In step 320, the computing device accesses an input repository in order to look up elements of the user input. In some embodiments, the input repository is stored in a data store on the device. The input repository provides a way to store and compare user input to a set of input items (e.g., known terms, words, phrases, and/or phonemes); in some embodiments, the input repository also provides a way to evaluate the user input with respect to spelling, capitalization, punctuation, or other similar aspects. It may also evaluate the user input in light of a collection of grammar rules (including user-specific grammar rules). The input repository may include user-specific input items that have been added to the input repository to customize the repository for individual user(s) of the device. In some embodiments, the user-specific input items are retrieved based on a user identifier that identifies either a device or an individual user (e.g., MAC address, login/password, user ID).

In some embodiments, the plurality of input items are classified within the input repository according to a probabilistic model. Any conventional and appropriate probabilistic model may be used, e.g., a Bayesian network, an n-gram model, a hidden Markov model, etc. Such probabilistic models may be used to infer the user's intended final user input in light of characters that have already been input by the user.

In step 330, one or more input predictions are inferred by applying the probabilistic model to the user text input. For example, in an embodiment based upon a Bayesian network, the plurality of input items are mapped over a set of neighboring nodes in the network, and an input prediction may be determined by mapping the received user input to a set of neighboring nodes $N_{1,\ X}$ in the network, and then, for each child node of node $N_X$, applying its probability function to calculate a posterior probability distribution for each child node $N_{X+1}$ given nodes $N_{1,\ X}$. In some embodiments, the set of one or more input predictions may include the entire set of possible results that depend from node $N_X$ in the network. In some embodiments, the set of one or more input predictions may include only those possible results that depend from node $N_X$ in the network and have a probability higher than a specified threshold. In some embodiments, the set of one or more input predictions may include only the top two (or three or four, etc.) possible results with the highest probability, and that depend from node $N_X$ in the network.

In step 340, the computing device presents suggested text using an output element of the device. In some embodiments, suggested input includes only the input prediction with the highest probability; in some embodiments, suggested input includes the entire set of one or more input predictions.

Suggested input may be presented using any appropriate output element of the device. In some embodiments, suggested input is displayed on a visual output element, such as a screen of the device, or transmitted to a display via a video output of the device. In some embodiments, displaying a suggested input comprises replacing the user input as entered on the screen with the suggested input (typically, only in cases where the suggested input includes only a single input prediction). In some embodiments, displaying a suggested input comprises displaying a pop-up window, text area, drop-down/scrolling listbox, or selection of radio buttons that display one or more input predictions. In some embodiments, suggested input is presented using an audio output element of the device, such as may include verbalizations or other sounds transmitted using a speaker embedded in the device or transmitted via an audio output of the device to a speaker, headphones, or the like. In some embodiments, displaying a suggested input comprises utilizing a haptic interface of the device to transmit mechanical stimulation through an actuation mechanism of the device.

In step 350, the computing device detects that further user input has been received. The user may have accepted or selected one of the input predictions, or the user may have implicitly or explicitly declined to utilize the suggested input and entered a user override. In the case of an acceptance, there may be multiple ways to present a suggested input. In some embodiments, when the original user text input is simply replaced with the suggested text, the user may implicitly indicate acceptance by continuing to type and not going back to undo the suggested input. In some embodiments, when the suggested input is presented as a list of options, the user may explicitly indicate acceptance of the suggested input by selecting one of the options. In some embodiments, one or more buttons may be provided to enable a user to indicate that a particular suggested input should always be used or should never be used.

In the case of a user override, entry of an override trigger is detected immediately after a suggested input was presented. An override trigger is an indication that the suggested input may have been inappropriate, so the user text input that follows the override trigger indicates that the input repository needs to be updated. In some embodiments, the override trigger comprises a completely explicit type of user input, such as clicking on a "Cancel" button that is presented along with the suggested input. In some embodiments, the override trigger comprises a less obvious, but still explicit, type of user input, such as using the backspace key to delete a suggested input that automatically replaced the user text input. In some embodiments, the override trigger may be followed by replacement user text input. In some embodiments, the override trigger may be more implicit, such as by continuing to type in disregard of a suggested input that is presented after the user typed the first few characters. In some embodiments, one or more buttons may be provided to enable a user to indicate that a particular suggested input should always be overridden with the user text input.

In step 360, the computing device determines whether the user text input received in step 350 comprises a user override or user acceptance of the suggested text. In one embodiment, the user override is incorporated into the input repository regardless of whether the user override overrode or accepted the suggested text. In some embodiments, the user override may only be incorporated into the input repository in one of those two cases.

In step 370, the input repository is updated based on the further user input received in step 350. This step enables embodiments to "learn" from the user's input and acceptance of suggested input or entry of override triggers. In some cases, replacement user text input may be added to the input repository as new input items, and in other cases, an existing input item in the input repository may have their probabilities updated to place greater weight upon the existing input item. In some embodiments, the updating comprises classifying replacement user text input associated with the user override within the probabilistic model. In such embodiments based on a Bayesian network, additional nodes may be added to the network, and a prior probability distribution of the probabilistic model may be updated. In some embodiments, updating the prior probability distribution comprises updating a smoothing algorithm associated with the nodes in the network. In some embodiments, the user override may be separately stored in the input repository. In step 380, if appropriate, a second suggested input may be presented using the output element of the device, as with the suggested text.

Figure 4:
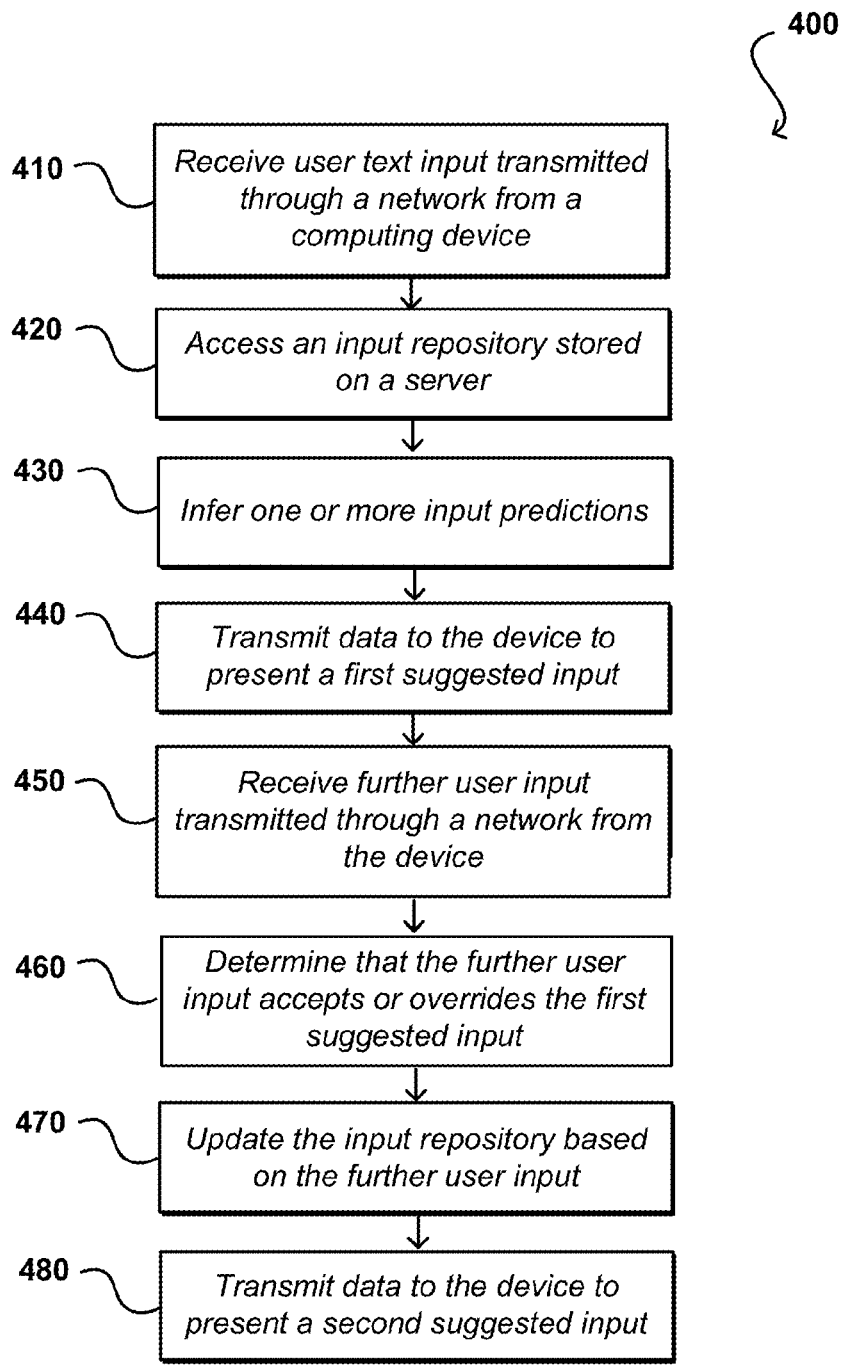
FIG. 4 illustrates an example process that can be executed in a cloud- or server-based embodiment in accordance with various embodiments.

FIG. 4 illustrates an example process 400 that can be executed using a cloud- or server-based embodiment in accordance with various embodiments. In some embodiments, cloud- or server-based platforms, operating systems, APIs, applications, or web services provide functionality to analyze user input on the fly, predict the user's intended final input, and, upon entry of a terminating character, replace the user's typed characters with the predicted input.

In step 410, a server (in a cloud or otherwise) receives user text input that was entered into a computing device and, in at least some embodiments, transferred across a network. In step 420, the server accesses an input repository in order to look up elements of the user input. In some embodiments, the input repository is stored in a data store, which may be stored on a server or other appropriate device, in a cloud or otherwise. The input repository provides a way to store and compare user input to a set of input items (e.g., known terms, words, phrases, and/or phonemes); in some embodiments, the input repository also provides a way to evaluate the user input with respect to spelling, capitalization, punctuation, or other similar aspects. It may also evaluate the user input in light of a collection of grammar rules (including user-specific grammar rules). The input repository may include user-specific input items that have been added to the input repository to customize the repository for individual user(s), where user-specific input items can be retrieved based on a user identifier that identifies either a device or an individual user, etc. As discussed above, the plurality of input items can be classified within the input repository according to at least one probabilistic model, such as a Bayesian network, n-gram model, hidden Markov model, etc. Such probabilistic models may be used to infer the user's intended final user input in light of characters that have already been input by the user.

In step 430, the server infers one or more input predictions by applying the probabilistic model to the user text input, using a process such as that described above with respect to FIG. 3. In step 440, the server transmits data in order to present suggested text via an output element of the device. In some embodiments, suggested input includes only the input prediction with the highest probability; in some embodiments, suggested input includes the entire set of one or more input predictions. Suggested input may be presented using any appropriate output element of the device as discussed elsewhere herein.

In step 450, the server detects that further user input has been received. The user may have accepted or selected one of the input predictions, or the user may have implicitly or explicitly declined to utilize the suggested input and entered a user override. In step 460, the server determines whether the user text input received in step 450 comprises a user override or user acceptance of the suggested text. In one embodiment, the user override is incorporated into the input repository regardless of whether the user override overrode or accepted the suggested text. In some embodiments, the user override may only be incorporated into the input repository in one of those two cases. In step 470, the server updates the input repository based on the further user input received in step 450, such that various embodiments are able to "learn" from the user's input and acceptance of suggested input or entry of override triggers. In step 480, if appropriate, the server transmits data to present a second suggested input via the output element of the device.

FIGS. 5(a)-(e) illustrate a series of screenshots of an example text messaging session in accordance with various embodiments, such as is described in FIG. 3, using a computing device (including elements 120 and 124) as shown in FIG. 2. As in FIG. 2, the text messaging software application presents a messaging window 120 that includes a scrolling display area to display messages and a text entry area 124 where a user enters their input.

Figure 5A:
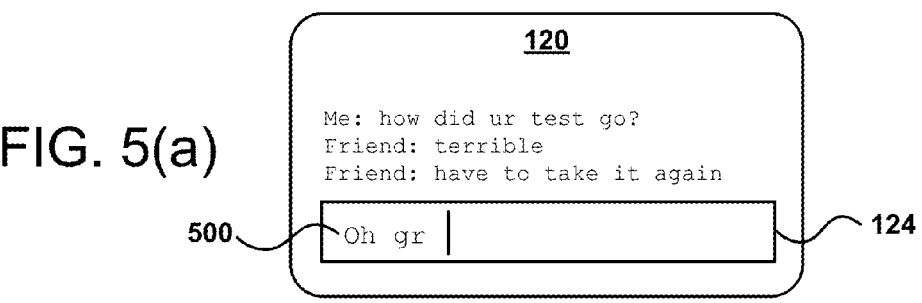
FIGS. 5(a)-(e) illustrate an example series of screenshots in accordance with various embodiments.
Figure 5B:
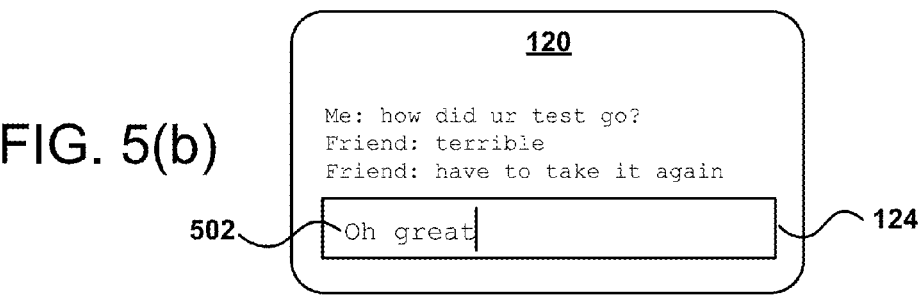

In FIG. 5(a), the user enters several characters 500 ("Oh gr") in text entry area 124, ending with a terminating character (a space). After accessing the input repository, which is stored in a data store on the device, the device determines that the first group of input characters ("Oh") is a known word, and that the second group of characters is not known to the device and/or application. The device infers the most likely input prediction, and in FIG. 5(b), suggested text 502 is presented on the device. In this embodiment, the user input 500 ("Oh gr") is automatically replaced by the suggested input ("Oh great") 502. However, because that is not what the user intended, in FIG. 5(c), the user uses the backspace key (non-character user input 504) to delete the last three characters of the suggested input to get back to the previous state of the user input 506 as illustrated in FIG. 5(d), thereby indicating an override trigger. The user then enters input 508 ("Oh grrr"), which can also be seen from the text message history shown in the scrolling display area in FIG. 5(e). In FIG. 5(d), the user input 506 was the same as was previously replaced. However, this time around, since the device "learned" from the user's prior override of the device's suggested input, as shown in FIG. 5(e), the device did not present a different suggestion. On subsequent user input including a similar string of characters, the device then could present an accurate second suggested input ("Oh grrr") after learning that particular input string.

Figure 6A:
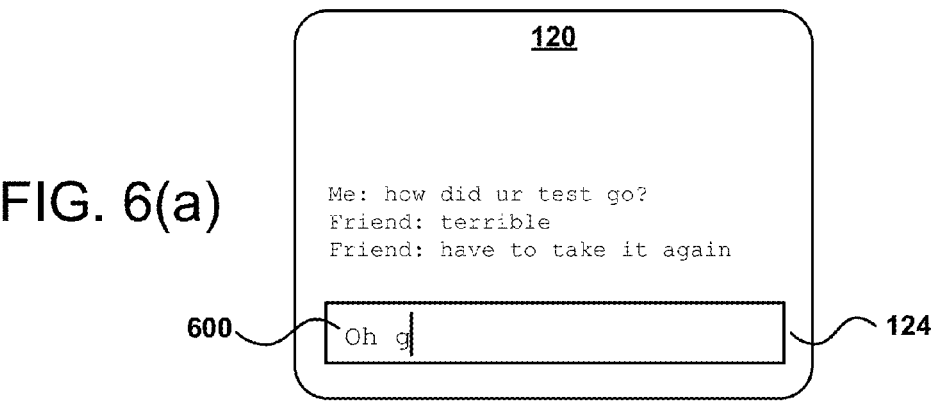
FIGS. 6(a)-(d) illustrate an example series of screenshots in accordance with various embodiments.
Figure 6B:
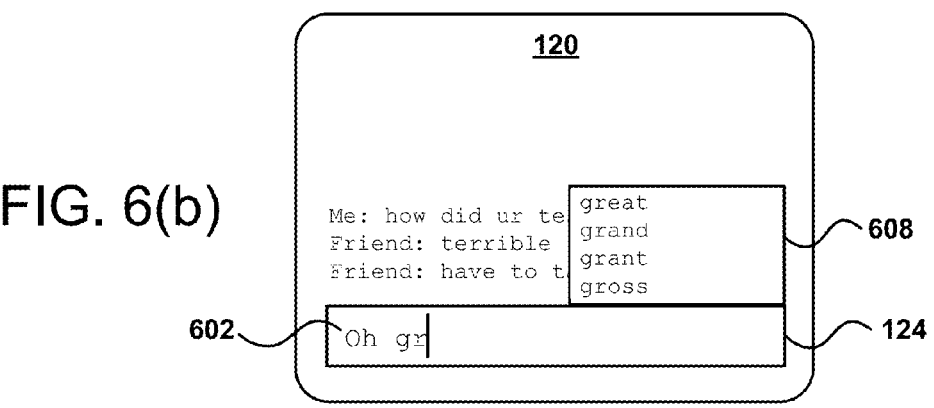
Figure 6C:
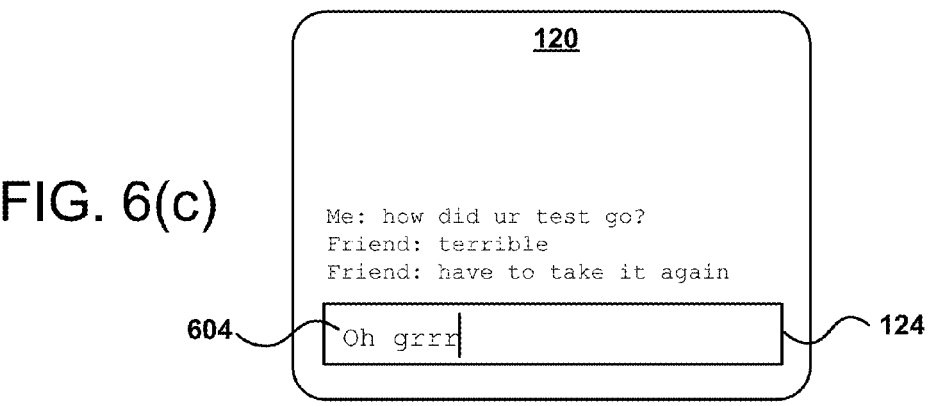
Figure 6D:
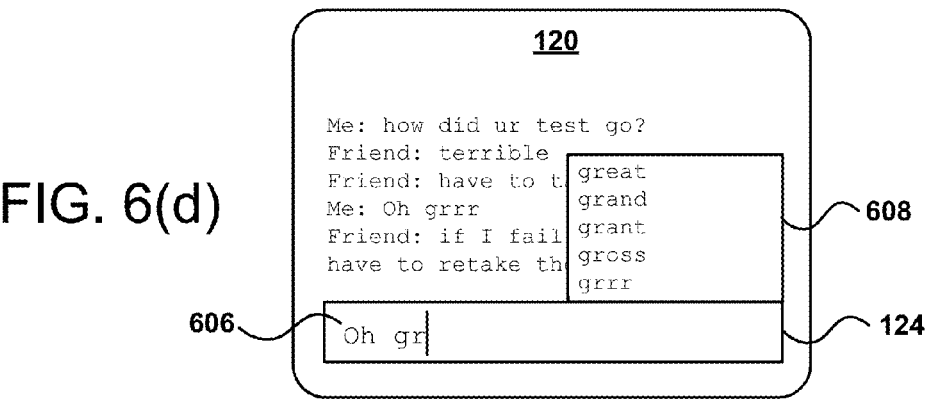

FIGS. 6(a)-(d) illustrate a series of screenshots of another example text messaging session in accordance with various embodiments, such as is described in FIG. 3, using a computing device (including elements 120 and 124) as shown in FIG. 2. In FIG. 6(a), the user begins to enter a phrase 600. As the user enters user input, the device traverses the input repository, which may be stored in a data store on the device, in order to detect opportunities to provide suggested input. As shown in FIG. 6(b), once the user has entered input 602 ("Oh gr"), the device determines that it should suggest input for the group of characters ("gr"). The device infers the most likely input prediction, and suggested text is presented on the device. In this embodiment, the suggested input comprises a selectable list of options 608. However, in this example the user disregards the options and continues to type user input 604, thereby implicitly indicating an override trigger, so the device removes the selectable list of options 608, as shown in FIG. 6(c). At some point in the future as illustrated in FIG. 6(d), the user re-enters the same character input 606 ("gr") that was entered in FIG. 6(b). However, this time around, since the device "learned" from the user's prior override of the device's suggested input, the device presents an improved suggested input that includes the most recent addition to the input repository ("grrr"), as shown at the bottom of the selectable list of options 608.

Figure 7A:
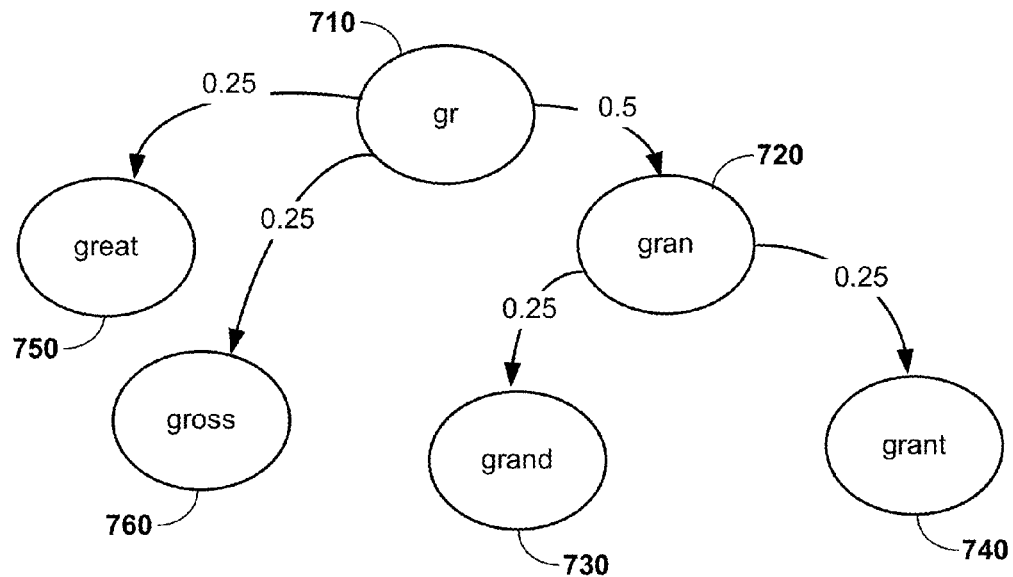
FIGS. 7(a)-(b) illustrate an example evolution of a Bayesian network in accordance with the example use cases depicted in FIGS. 5(a)-(e) and FIGS. 6(a)-(d)
Figure 7B:
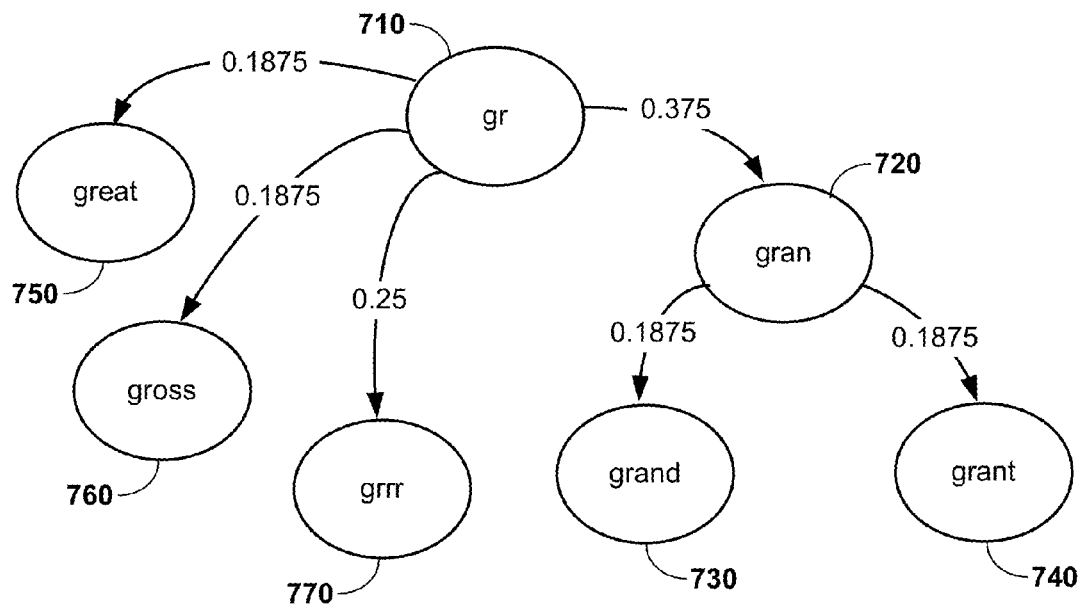

FIGS. 7(a)-(b) illustrate an example evolution of a Bayesian network in accordance with the example use case depicted in FIGS. 5(a)-(e) and FIGS. 6(a)-(d). FIG. 7(a) illustrates an initial state of the Bayesian network. Node 710 (which represents the text "gr") is the entry node for all possible terms (currently represented in the Bayesian network) that could be inferred from the text "gr". In some cases, intermediary nodes may be present in the network where branches exist (e.g., intermediary node 720, representing text "gran"), leads to leaf nodes 730 ("grand") and 740 ("grant")). In some cases, leaf nodes may directly depend from node 710 (e.g., leaf nodes 750 ("great") and 760 ("gross")). A prior probability distribution associates each node depending from node 710 with a particular value. In the example shown in FIG. 7(a), leaf nodes in the network are initially assigned equal prior probabilities (0.25). As one of skill in the art would be aware, it is possible to have disparate values distributed as prior probabilities.

Figure 5C:
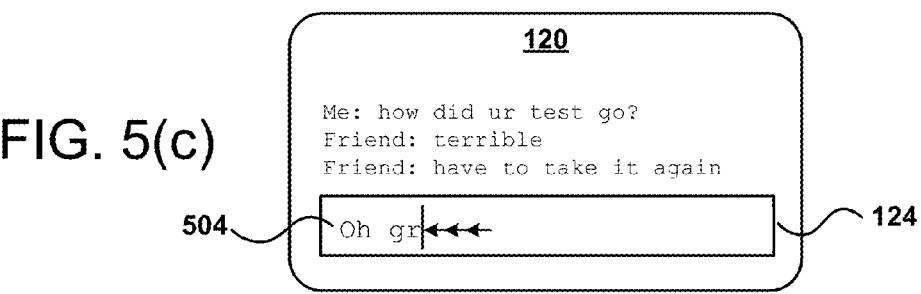
Figure 5D:
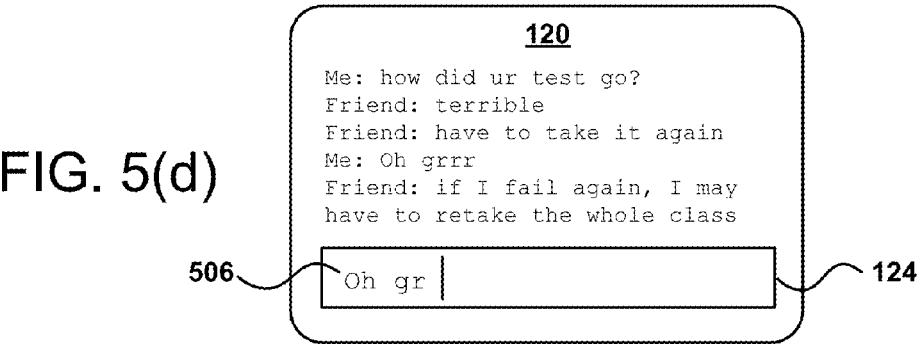
Figure 5E:
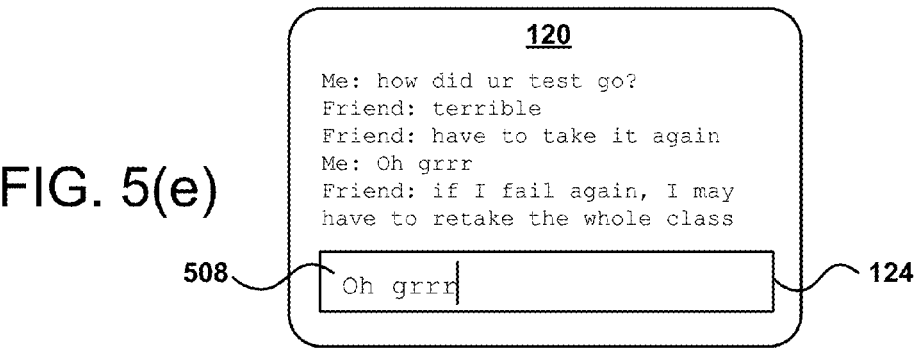

FIG. 7(b) illustrates the Bayesian network after it has evolved (such as is described with respect to FIG. 3, at step 370) to update the input repository based on user text input associated with a user override, as shown by example in different contexts in FIGS. 5(c) and 6(c). New leaf node 770 has been added to incorporate the user text input ("gar") associated with the user override. In addition, the prior probability distribution has been re-calculated and updated to account for the new leaf node. In some embodiments, when prior probabilities are re-calculated due to insertion of a new node, the probability assigned to the new leaf node is given greater weight than the average probability assigned to the leaf nodes prior to insertion of the new leaf node. In the example shown in FIG. 7(b), new leaf node 770 is assigned the average probability (0.25) of all of the other leaf nodes, and the remaining probabilities are distributed amongst leaf nodes 730, 740, 750, and 760 (0.1875 each). In some embodiments, the probabilities may be re-calculated based on a weighted observation in a learning model used for training. In some embodiments, the prior probability assigned to new leaf node 770 may be less than the average probability assigned to the leaf nodes prior to the insertion of new leaf node 770 (or even zero). In some embodiments, the prior probability may be re-calculated to assign equal probabilities to all leaf nodes, including the new leaf node. The text of node 770 ("gar") is now the default text input option because it has a higher prior probability than any other leaf node.

Figure 8A:
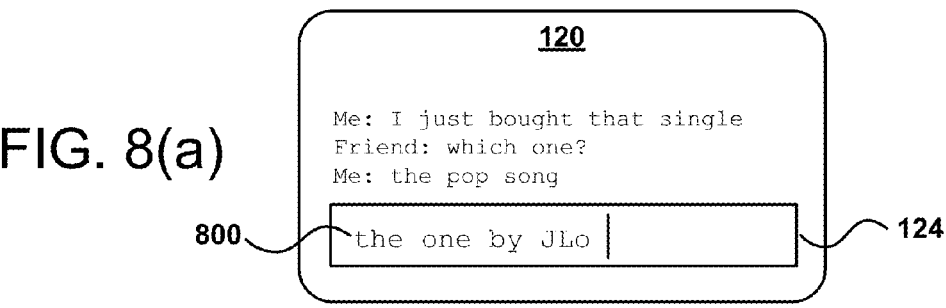
FIGS. 8(a)-(e) illustrate an example series of screenshots in accordance with various embodiments.
Figure 8B:
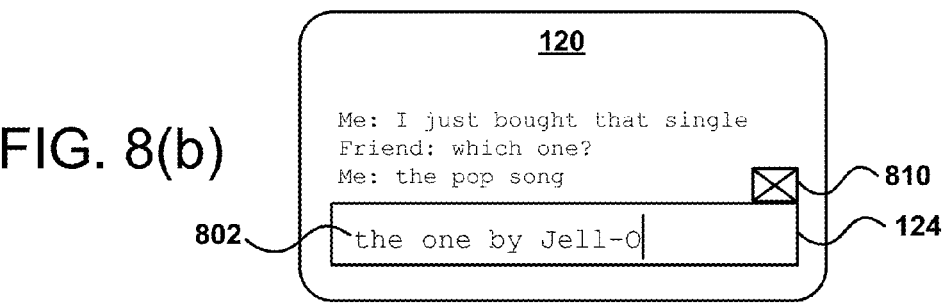
Figure 8C:
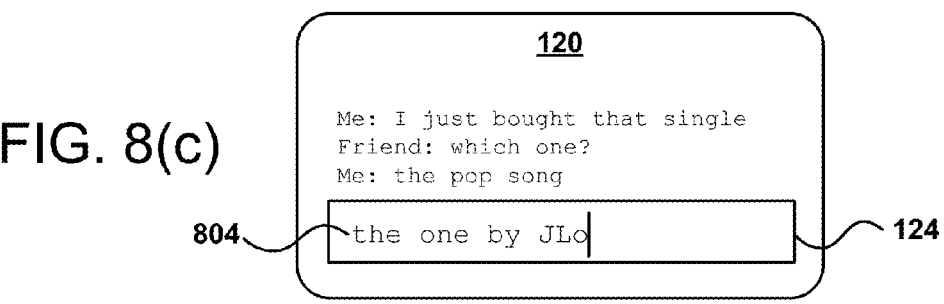
Figure 8D:
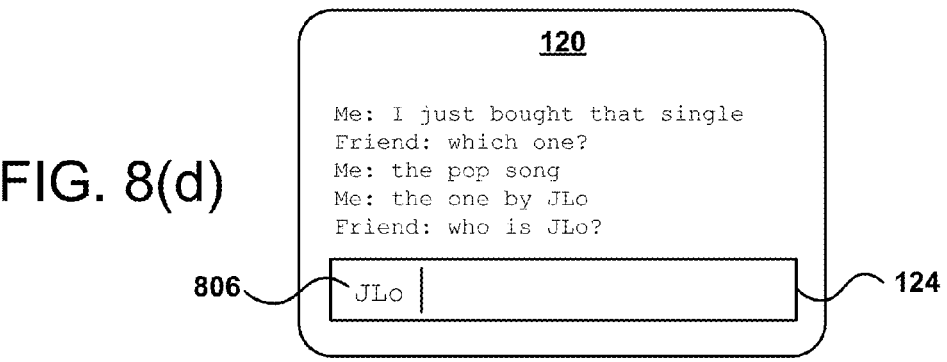
Figure 8E:
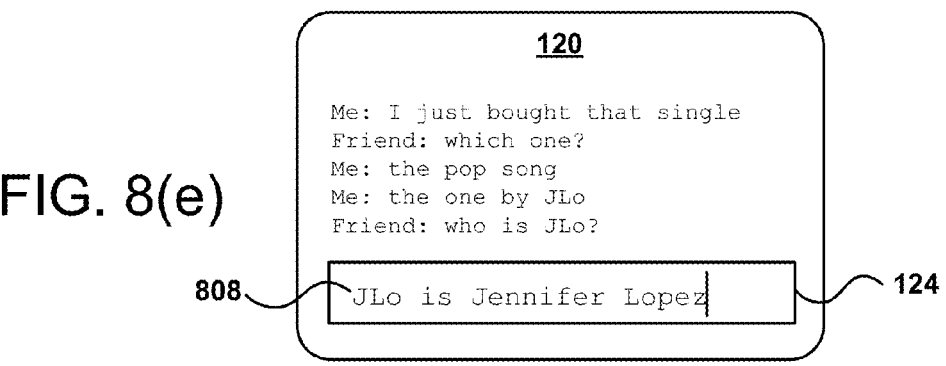

FIGS. 8(a)-(e) illustrate a series of screenshots of an example text messaging session in accordance with various embodiments, such as is described in FIG. 3, using a computing device (and elements 120 and 124) as shown in FIG. 2. In FIG. 8(a), the user enters a phrase 800 ("the one by JLo"), ending with a terminating character (a space). After accessing the input repository, which is stored in a data store on the device, the device determines that the last group of characters ("JLo") is not known. The device infers the most likely input prediction, and, as shown in FIG. 8(b), suggested text 802 is presented on the device. In this embodiment, the user input ("JLo") is automatically replaced by the suggested input ("Jell-O"). However, in this embodiment, a cancel button 810 is provided to enable the user to explicitly override the suggestion without having to use the backspace key. After the user hits cancel button (non-character user input 810), thereby indicating an override trigger, user input 804 matching the user's initial input is restored, as shown in FIG. 8(c). At some subsequent point in time as illustrated in FIG. 8(d), the user re-enters the same character input 806 ("JLo") that was entered in FIG. 8(a). However, this time around, since the device "learned" from the user's prior override of the device's suggested input, as shown in FIG. 8(e), the device does not attempt to replace the user input with suggested input, and can enable the user to continue providing user input 808.

Figure 9A:
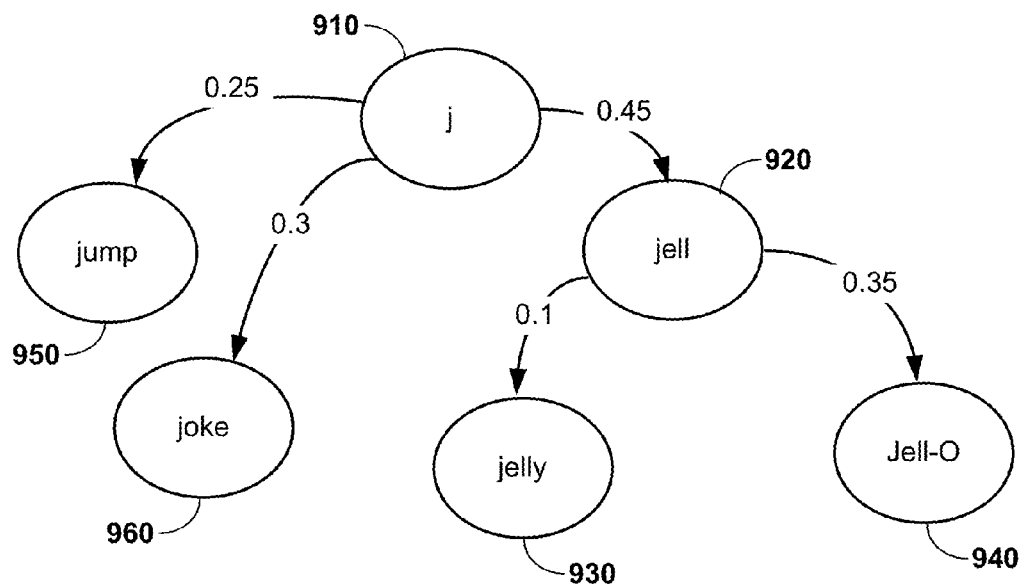
FIGS. 9(a)-(b) illustrate an example evolution of a Bayesian network in accordance with the example use case depicted in FIGS. 8(a)-(e)
Figure 9B:
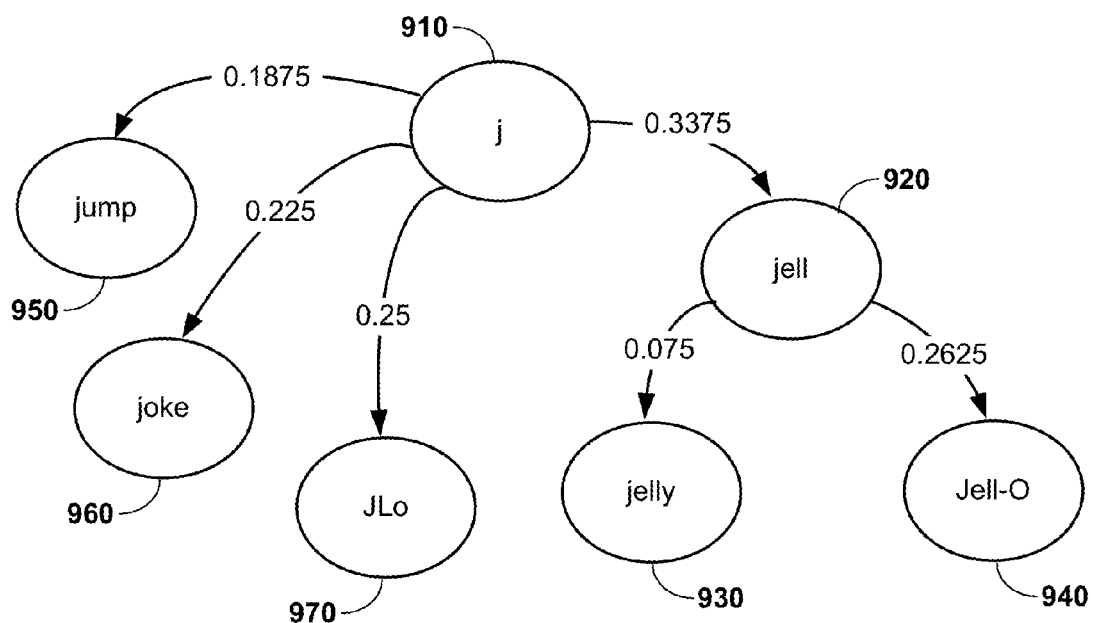

FIGS. 9(a)-(b) illustrate an example evolution of a Bayesian network in accordance with the example use case depicted in FIG. 8. FIG. 9(a) illustrates an initial state of the Bayesian network. Node 910 (which represents the text "j") is the entry node for all possible terms (currently represented in the Bayesian network) that could be inferred from the text "j" which, along with intermediary node 920, leads to various leaf nodes that can be selected as predicted and/or suggested input text. It should be understood that intermediate nodes such as node 920 will typically have a higher combined probability than any individual leaf node that is associated with that intermediate node, and thus contributes to the combined probability, but the intermediate node will typically be a "stem" or other intermediate form that is not selectable as suggested text. In at least some embodiments, only leaf nodes are selectable as predicted or suggested input. In the example shown in FIG. 9(a), nodes depending from node 910 are initially assigned distinct prior probabilities, as shown in Table A below.

TABLE A

Initial Prior Probability Distribution

| Node | Text | Prior Probability | Node Type |
|---|---|---|---|
| 920 | jell | 0.45 | intermediary |
| 930 | jelly | 0.1 | leaf |
| 940 | Jell-O | 0.35 | leaf |
| 950 | jump | 0.25 | leaf |
| 960 | joke | 0.3 | leaf |

FIG. 9(b) illustrates the Bayesian network after it has evolved (such as is described with respect to FIG. 3, step 370) to update the input repository based on user text input associated with a user override, as shown by example in FIG. 8(c). New leaf node 970 has been added to incorporate the user text input ("JLo") associated with the user override. In addition, the prior probability distribution has been re-calculated and updated to account for the new leaf node. In some embodiments, when prior probabilities are re-calculated due to insertion of a new node, the probability assigned to the new leaf node is given greater weight than the average probability assigned to the leaf nodes prior to insertion of the new leaf node. In the example shown in FIG. 9(b), new leaf node 970 is assigned the average probability (0.25) of all of the other leaf nodes, and the remaining probabilities are distributed amongst leaf nodes 930, 940, 950, and 960 (as shown in Table B below).

TABLE B

Post-Evolution Prior Probability Distribution

| Node | Text | Prior Probability | Node Type |
|---|---|---|---|
| 920 | jell | 0.3375 | intermediary |
| 930 | jelly | 0.075 | leaf |
| 940 | Jell-O | 0.2625 | leaf |
| 950 | jump | 0.1875 | leaf |
| 960 | joke | 0.225 | leaf |
| 970 | JLo | 0.25 | leaf |

Figure 10:
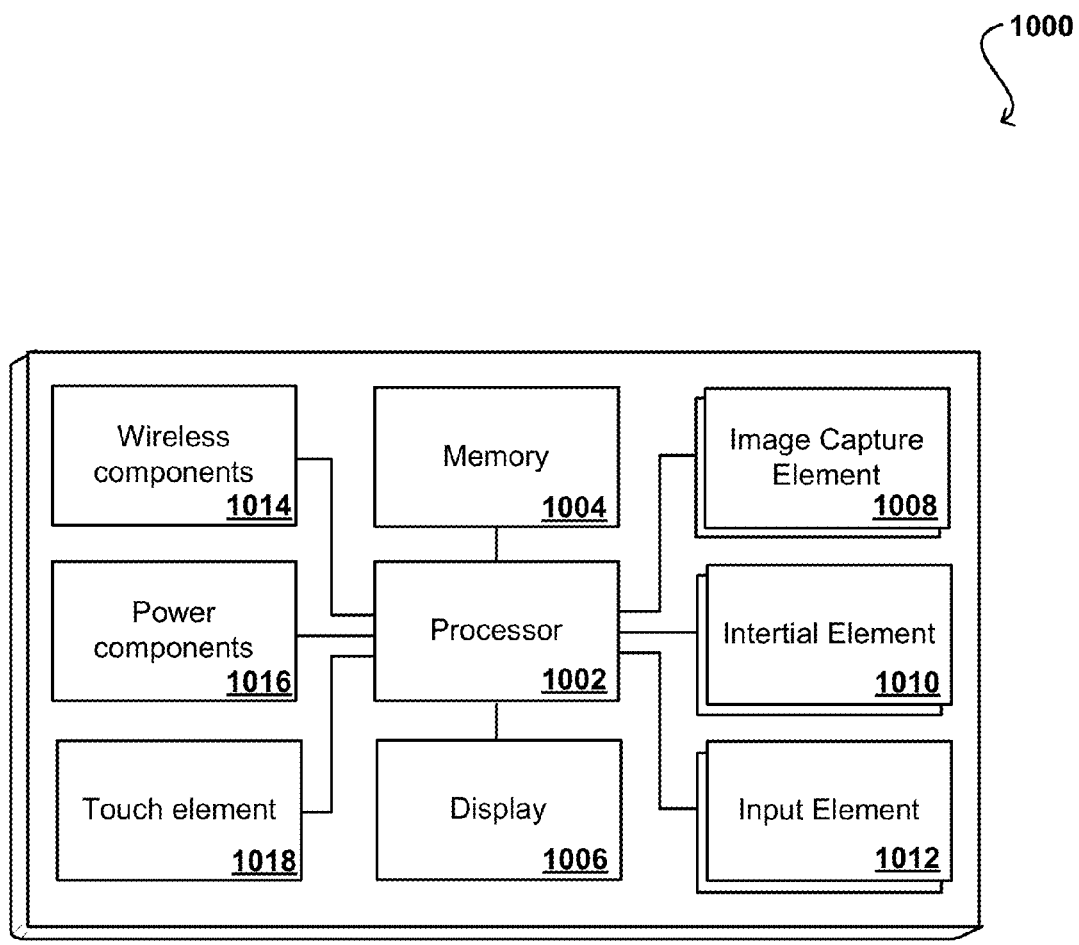
FIG. 10 illustrates an example configuration of components of a computing device that can be used in accordance with various embodiments.

In order to provide functionality such as that described herein, FIG. 10 illustrates an example set of basic components of a computing device 1000, such as the device 100 described with respect to FIG. 1. In this example, the device includes at least one processor 1002 for executing instructions that can be stored in at least one memory device or element 1004. As would be apparent to one of ordinary skill in the art, the device can include many types of memory, data storage or computer-readable storage media, such as a first data storage for program instructions for execution by the processor 1002, the same or separate storage can be used for images or data, a removable storage memory can be available for sharing information with other devices, etc. The device typically will include some type of display element 1006, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1008, such as one or more cameras that are able to image a user, people, or objects in the vicinity of the device. In at least some embodiments, the device can use the image information to determine gestures or motions of the user, which will enable the user to provide input through the computing device without having to actually contact and/or move the device. An image capture element also can be used to determine movement of the device, as discussed herein. An image capture element can include any appropriate technology, such as a CCD image capture element having a sufficient resolution, focal range and viewable area, to capture an image of the user when the user is operating the device. The device can include at least one additional input device 1012 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 1016 known in the art for providing power to a computing device, which can include capacitive charging elements for use with a power pad or similar device as discussed elsewhere herein. The example device also can include at least one touch- and/or pressure-sensitive element 1018, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

Figure 11:
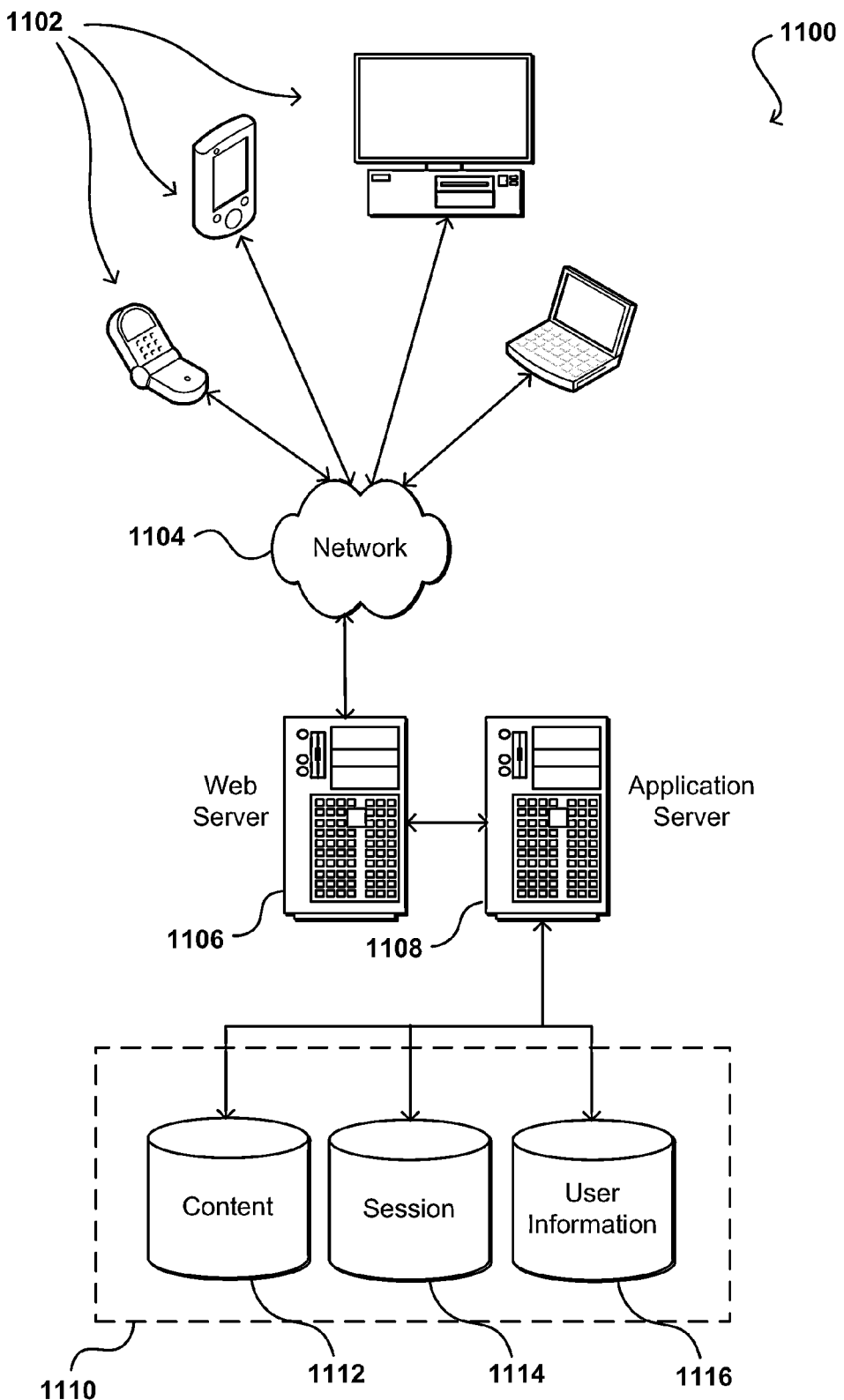
FIG. 11 illustrates an environment in which various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for predicting user text input in an electronic environment, comprising:
    one or more device processors; and
    a memory device including instructions that, when executed by the one or more device processors, cause the system to:
        receive, over a communications network, the user text input;
        access a text repository storing a plurality of text items classified according to a Bayesian network;
        infer one or more input predictions through, at least in part, locating the user text input in the Bayesian network;
        transmit data, over the communications network, including a suggested text based at least in part on the user text input and the inferred one or more input predictions;
        receive, over the communications network, an indication of a user override of the suggested text, the user override including one or more entries of a backspace key and replacement user text input; and
        update a probability of at least one node of the Bayesian network corresponding to the user override,
        wherein the probability of the at least one node is based at least in part upon an average probability of one or more other nodes of the Bayesian network when the at least one node is a new node of the Bayesian network, the one or more other nodes corresponding to a same intermediary node of the Bayesian network as the at least one node.

2. The system of claim 1, wherein accessing the text repository comprises retrieving user-specific text items based on a user identifier.

3. The system of claim 1, wherein the user text input comprises one or more alphanumeric characters.

4. A computer-implemented method for intelligently predicting user input entered on a computing device, comprising:
    receiving, on the computing device, user text input;
    accessing a text repository including a plurality of text items classified according to a probabilistic model;
    inferring, using a processor of the computing device, one or more input predictions by applying the probabilistic model to the user text input;
    presenting, using a visual output element of the computing device, a suggested text based on the one or more input predictions;
    receiving, on the computing device, an indication of a user override of the suggested text; and
    updating at least one probability of the probabilistic model, the at least one probability corresponding to the user override,
    wherein the at least one probability is based at least in part upon an average probability of one or more other probabilities of the probabilistic model when the user override is a new probability of the probabilistic model, the one or more other probabilities corresponding to the text items that have at least some same text as the user override.

5. The computer-implemented method of claim 4, wherein receiving the indication of the user override of the suggested text comprises detecting an override trigger in the user override, wherein the override trigger comprises an explicit override or an implicit override.

6. The computer-implemented method of claim 4, further comprising:
presenting, using the visual output element of the computing device, a second suggested text related to the user text input and the user override.

7. The computer-implemented method of claim 4, wherein the user text input comprises at least one non-space character followed by a space or punctuation character.

8. The computer-implemented method of claim 4, wherein accessing the text repository comprises retrieving user-specific text items from a data store on the computing device.

9. The computer-implemented method of claim 4, wherein the text repository stores data representing a user-specific collection of vocabulary terms, and wherein the suggested text comprises one or more vocabulary terms or a correction regarding spelling.

10. The computer-implemented method of claim 4, wherein the text repository comprises a set of user-specific grammar rules, and wherein the suggested text comprises a correction regarding capitalization, punctuation, or grammar.

11. The computer-implemented method of claim 4, wherein the probabilistic model comprises a Bayesian network, an n-gram model, or a hidden Markov model.

12. The computer-implemented method of claim 4, wherein updating the text repository based on the user override comprises storing the user override in the text repository.

13. The computer-implemented method of claim 4, wherein applying the probabilistic model to the user text input comprises determining the one or more input predictions according to a posterior probability distribution.

14. The computer-implemented method of claim 13, wherein classifying the user override within the probabilistic model comprises updating a prior probability distribution of the probabilistic model.

15. The computer-implemented method of claim 13, wherein classifying the user override within the probabilistic model comprises updating a smoothing algorithm associated with the plurality of text items in the text repository.

16. The computer-implemented method of claim 4, wherein presenting the suggested text comprises modifying the user text input to an input prediction with at least a minimum probability.

17. A computing device, comprising:
a processor;
at least one input detection element;
at least one display element; and
a memory device including instructions operable to be executed by the processor to perform a set of actions, enabling the computing device to:
receive user text input via the at least one input detection element;
compare the user text input against a text repository including a plurality of text items classified according to a probabilistic model to determine at least one predicted input string;
provide the at east one predicted input string for display on the at least one display element;
receive, via the at least one input detection element, an indication of a user override of the at least one predicted input string; and
update at least one probability of the probabilistic model, the at least one probability corresponding to the user override,
wherein the at least one probability is based at least in part upon an average probability of one or more other probabilities of the probabilistic model when the user override is a new probability of the probabilistic model, the one or more other probabilities corresponding to the text items that have at least some same text as the user override.

18. The computing device of claim 17, wherein the user text input is detected through at least one of an applied pressure, physical contact, gesture, or audio command of a user with respect to the computing device.

19. The computing device of claim 17, wherein the memory device further includes instructions that, when executed, cause the computing device to:
present, using the at least one display element of the computing device, a second suggested text related to the user text input and the user override.

20. The computing device of claim 17, wherein the at least one display element of the computing device includes a display screen or a video output, and wherein presenting a suggested text related to the user text input comprises displaying the suggested text on the display screen or using the video output of the computing device.

21. The computing device of claim 17, wherein the instructions to provide the at least one predicted input string further enable the computing device to:
display a pop-up text area including one or more suggested terms that are able to be selected.

22. One or more non-transitory computer-readable storage media having collectively stored thereon instructions that, when executed by one or more processors of a network system, cause the network system to at least:
obtain user text input entered by a user into an electronic device;
determine at least one input prediction by applying a probabilistic model to the user text input and selecting one or more associated text items from a text repository classified according to the probabilistic model;
transmit information including the at least one input suggestion for presentation to the user on the electronic device;
receive an indication of a user override of the at least one input suggestion on the electronic device; and
update at least one probability of the probabilistic model, the at least one probability corresponding to the user override,
wherein the at least one probability is based at least in part upon an average probability of one or more other probabilities of the probabilistic model when the user override is a new probability of the probabilistic model, the one or more other probabilities corresponding to the one or more associated text items that have at least some same text as the user override.

23. The one or more non-transitory computer-readable storage media of claim 22, wherein the instructions when executed further cause the network system to:
receive a subsequent instance of the user text input entered by the user; and
determine at least one input prediction utilizing any text associated with the user override.

24. The one or more non-transitory computer-readable storage media of claim 22, wherein the instructions when executed further cause the network system to:
receive a subsequent instance of the user text input entered by the user; and
determine at least one different input prediction based upon information stored for the user override.

25. The one or more non-transitory computer-readable storage media of claim 22, wherein an output element of the electronic device to present the at least one input suggestion comprises a speaker or an audio output, and wherein the instructions when executed further cause the network system to:

transmit sound representing a voice enunciating the at least one input suggestion through the speaker or the audio output of the electronic device.

\* \* \* \* \*

UNITED STATES PATENT AND TRADEMARK OFFICE
CERTIFICATE OF CORRECTION

PATENT NO. : 8,712,931 B1
APPLICATION NO. : 13/172656
DATED : April 29, 2014
INVENTOR(S) : Christopher J. Wahlen Page 1 of 1

It is certified that error appears in the above-identified patent and that said Letters Patent is hereby corrected as shown below:

In the Claims

Column 15, Claim 17, Line 56-57, replace:
"provide the at east one predicted input string for display on the at least one display element;" with
"provide the at least one predicted input string for display on the at least one display element;"

Signed and Sealed this
Fourteenth Day of April, 2015

Michelle K. Lee
*Director of the United States Patent and Trademark Office*